United States Patent
Oikawa et al.

(10) Patent No.: US 7,274,541 B2
(45) Date of Patent: Sep. 25, 2007

(54) MAGNETIC THIN FILM HEAD, THE FABRICATION METHOD, AND MAGNETIC DISK

(75) Inventors: Gen Oikawa, Odawara (JP); Shuichi Kojima, Hiratsuka (JP); Harunobu Saito, Chigasaki (JP); Noriyuki Saiki, Odawara (JP); Masayasu Kagawa, Hiratsuka (JP); Akira Kondo, Naka-gun Ooiso (JP); Kenji Ishikake, Odawara (JP); Hiromi Shiina, Taga-gun Jyuo (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 0 days.

(21) Appl. No.: 11/095,533

(22) Filed: Apr. 1, 2005

(65) Prior Publication Data

US 2005/0168876 A1   Aug. 4, 2005

Related U.S. Application Data

(62) Division of application No. 09/784,141, filed on Feb. 16, 2001, now abandoned.

(30) Foreign Application Priority Data

Mar. 31, 2000   (JP)   ............................. 2000-101206

(51) Int. Cl.
   *G11B 5/147*   (2006.01)
   *G11B 5/39*   (2006.01)

(52) U.S. Cl. ................... 360/319; 360/317; 29/603.14
(58) Field of Classification Search .................... None
   See application file for complete search history.

(56) References Cited

U.S. PATENT DOCUMENTS

| 4,891,278 | A | * | 1/1990 | Otomo et al. ............... 428/681 |
| 5,287,237 | A | | 2/1994 | Kitada et al. |
| 6,025,978 | A | | 2/2000 | Hoshi et al. |
| 6,358,379 | B1 | | 3/2002 | Kouchiyama |
| 6,687,082 | B1 | | 2/2004 | Ishiwata et al. |
| 2001/0015878 | A1 | | 8/2001 | Varga et al. |

FOREIGN PATENT DOCUMENTS

| JP | 5-266432 | 10/1993 |
| JP | 11-16120 | 1/1999 |

* cited by examiner

*Primary Examiner*—Angel Castro
*Assistant Examiner*—Christopher R. Magee
(74) *Attorney, Agent, or Firm*—Mattingly, Stanger, Malur & Brundidge, P.C.

(57) ABSTRACT

In formation of an upper shield of a magnetic thin film head by electroplating, a current density of electroplating is regulated stepwise with time. Thus, in the upper shield formation, a film composition and magnetic characteristic with respect to the direction of film thickness can be controlled precisely, making it possible to provide a magnetic thin film head featuring significantly reduced noise-after-write and output fluctuation.

10 Claims, 10 Drawing Sheets

$$dVpp = \frac{|Vpp(MAX) - Vpp(min)|}{Vpp(Ave.)} \times 100\ (\%)$$

US 7,274,541 B2

MAGNETIC THIN FILM HEAD, THE FABRICATION METHOD, AND MAGNETIC DISK

This is a divisional application of U.S. Ser. No. 09/784,141, filed Feb. 16, 2001, now abandoned.

BACKGROUND OF THE INVENTION

1. Field of the Invention

The present invention relates to a plating film fabrication method, and more particularly to a magnetic thin film head fabrication method. Still more particularly, the invention relates to a magnetic thin film head fabrication method using an electroplating technique in which the composition of an initially formed layer in an upper shield of a magnetic thin film head is precisely controlled. Furthermore, the invention pertains to a magnetic thin film head manufactured by the magnetic thin film head fabrication method, and to a magnetic disk apparatus comprising the magnetic thin film head thus manufactured.

The invention is also applicable as a plating film fabrication method other than the magnetic thin film head fabrication method mentioned above, and it is possible to manufacture electronic circuit substrates using the plating film fabrication method according to the invention.

2. Description of the Related Art

Recently, there has been an ever increasing demand for higher density of recording and higher-rate signaling of data in magnetic disk apparatus. As a magnetic thin film head for use in a magnetic disk apparatus, an integrated head comprising an MR or GMR read head element and an inductive write head element has been developed.

In the magnetic thin film head, it is required to increase BPI (bits per inch) and TPI (tracks per inch) for realizing higher recording density. As the BPI and TPI increase, a read output tends to decrease. With a decrease in the read output, noise-after-write and output fluctuation have a significantly adverse effect thereon to cause a read error.

For realizing higher-rate communication, a write frequency has been shifted to a higher level, causing a tendency to increase noise-after-write.

The term "noise-after-write" used herein signifies a phenomenon in which noise is produced on a read output at the time of reading data recorded on a magnetic disk.

As demonstrated in FIG. 2, evaluation of noise-after-write can be performed in the following manner: A write current having a predetermined frequency is applied for a period of several tens of microseconds, and then after the write current is turned off, noise outputs exceeding a predetermined slice level are counted through a read head output terminal for a period of several tens of microseconds. In the evaluation of noise-after-write exemplified in FIG. 2, a write-read operation was repeated 10,000 times per magnetic thin film head slider, and a magnetic thin film head was judged to be defective if the number of noise outputs was larger than a predetermined value.

The term "output fluctuation" used herein signifies a phenomenon in which a read output amplitude decreases or increases at the time of reading data recorded on a magnetic disk. Since this phenomenon is accelerated by addition of a write operation, output fluctuation dvpp is expressed as shown in FIG. 3:

$$dvpp = |Vpp(MAX) - Vpp(min)|/Vpp(Ave) \times 100 \ (\%)$$

In the evaluation of output fluctuation exemplified in FIG. 3, a write-read operation was repeated 10,000 times per magnetic thin film head slider, and a magnetic thin film head was judged to be defective if the output fluctuation dvpp was higher than a predetermined percentage (%).

Conventionally, for effective reduction of noise-after-write and output fluctuation in the magnetic thin film head, shield film formation on the upper and lower sides of a sensor film serving as a read element is made in such a fashion that a film thickness of an upper shield and a magnetostriction constant $\lambda$ representing a magnetic characteristic thereof are controlled. FIG. 4 shows relationships among shield film thickness, noise-after-write, and output fluctuation. As the shield film thickness increases, both the noise-after-write and output fluctuation tend to decrease. The noise-after-write is minimized at a level of 4.5 µm in shield film thickness, and the output fluctuation is minimized at a level of 3.0 µm in shield film thickness. In the range of more than 3.5 µm in shield film thickness, however, read-track and write-track positioning accuracies are decreased on inner and outer tracks of a magnetic disk. Therefore, in consideration of the allowable ranges of noise-after-write and output fluctuation, it is required to provide a shield film thickness of 2.7 to 3.5 µm.

In FIG. 5, there are shown relationships among magnetostriction constant $\lambda$, noise-after-write, and output fluctuation. The noise-after-write is minimized in the vicinity of "magnetostriction constant $\lambda = -3.5 \times 10^{-7}$", and appreciably increases in the range of "magnetostriction constant $\lambda \geqq 0 \times 10^{-7}$". The output fluctuation is minimized in the vicinity of "magnetostriction constant $\lambda = -2.0 \times 10^{-7}$". NiFe permalloy used as a shield material has a magnetostriction constant which shifts to the range of +1.0 to +2.0×10$^{-7}$ in heat treatment taken as a post-process step. Therefore, in consideration of a shift of the magnetostriction constant due to the heat treatment along with the allowable ranges of noise-after-write and output fluctuation, it is required to provide a magnetostriction constant $\lambda$ of −2.0 to −4.0 ×10$^{-7}$. Under this condition, "Ni=80.8 to 81.2 wt %" is given in terms of relationship between magnetostriction constant $\lambda$ and film composition shown in FIG. 6. However, on a plating under-layer film, an initially formed layer of an upper shield film is liable to be Fe-rich, i.e., it has been found that Ni is 78.9 wt % and $\lambda$ is +4.8×10$^{-7}$ in an initially formed layer of 0.2 µm in thickness in a case where Ni is 81.1 wt % and $\lambda$ is −3.5×10$^{-7}$ in an upper shield film of 3.5 µm in thickness.

In view of the above, it is apparent that the noise-after-write and output fluctuation largely depend on the composition and magnetostriction constant of the initially formed layer of the upper shield film disposed in the vicinity of the sensor film. It is therefore required to improve the upper shield film for achieving higher recording density and higher-rate communication in magnetic disk apparatus.

SUMMARY OF THE INVENTION

For successful realization of higher recording density and higher-rate communication in magnetic disk apparatus, there is a necessity to use a magnetic thin film head capable of substantially reducing noise-after-write and output fluctuation.

As an upper shield film, a permalloy film having a magnetostriction constant $\lambda$ of −2.0 to −4.0×10$^{-7}$ and an Ni content of 80.8 to 81.2 wt % after plating could be provided for reducing the noise-after-write and output fluctuation. However, since the upper shield film tends to be Fe-rich in an initially formed plating layer, this film formation is unsatisfactory for substantially reducing the noise-afterwrite and output fluctuation in a magnetic disk apparatus scheme for higher-density higher-frequency recording.

It is therefore an object of the present invention to provide a magnetic thin film head which can overcome the above-mentioned disadvantage.

Another object of the present invention is to provide a high-performance magnetic disk apparatus comprising the above-stated magnetic thin film head.

In accomplishing these objects of the present invention, there is provided a magnetic thin film head which is fabricated in the following manner: In fabrication of the magnetic thin film head, an upper shield film is formed by electroplating with NiFe permalloy material so that the composition of an initially formed layer thereof is equivalent to that of an upper layer or Ni-rich in comparison therewith or so that the magnetostriction constant of the initially formed layer is equivalent to or smaller than that of the upper layer. In this film formation, a current value of electroplating is regulated in the same plating bath.

In carrying out the present invention and according to a first aspect thereof, there is provided a magnetic thin film head comprising: a write head element; and a read head element; wherein a ferromagnetic film having a soft magnetic characteristic and a magnetic shield function is formed of NiFe permalloy material by electroplating in the vicinity of a sensor film arranged as the read head element, wherein Ni in composition of an initially formed layer having a thickness of 1.0 μm is 80.8 to 82.0 wt %, and wherein Ni in composition of an upper layer on the initially formed layer 1.0 μm thick is 81.0 to 81.2 wt %.

Further, according to a second aspect of the present invention, there is provided a magnetic thin film head comprising: a write head element; and a read head element; wherein a ferromagnetic film having a soft magnetic characteristic and a magnetic shield function is formed of NiFe permalloy material by electroplating in the vicinity of a sensor film arranged as the read head element, wherein a magnetostriction constant $\lambda$ representing a magnetic characteristic of the ferromagnetic film is $-2.0$ to $-7.0 \times 10^{-7}$ in an initially formed layer having a thickness of 1.0 μm, and wherein the magnetostriction constant $\lambda$ is $-3.0$ to $-4.0 \times 10^{-7}$ in an upper layer on the initially formed layer 1.0 μm thick.

Still further, according to a third aspect of the present invention, there is provided a magnetic thin film head comprising: a write head element; and a read head element; wherein a ferromagnetic film having a soft magnetic characteristic and a magnetic shield function is formed of NiFe permalloy material by electroplating in the vicinity of a sensor film arranged as the read head element, wherein a film thickness exceeding 1.0 μm in the ferromagnetic film formed of NiFe permalloy material has an Ni content accuracy of ±0.1 wt %, and wherein a film thickness of 1.0 μm or less in the ferromagnetic film formed of NiFe permalloy material has an Ni content accuracy of ±0.3 wt %.

Furthermore, according a fourth aspect of the present invention, there is provided a method of fabricating a magnetic thin film head as in any of the above-mentioned first to third aspects of the present invention, comprising the step of: timewise regulating a current density of permalloy electroplating under control of a personal computer; wherein a plurality of time periods and a plurality of current values are preset for film formation.

Still further, according to a fifth aspect of the present invention, there is provided a magnetic disk apparatus comprising a magnetic thin film head as in any of the above-mentioned first to third aspects of the present invention.

The above and other objects, features and advantages of the present invention will become more apparent from the following detailed description with reference to the accompanying drawings.

DETAILED DESCRIPTION OF THE PREFERRED EMBODIMENTS

The present invention concerning a magnetic thin film head and a method of fabricating the same will now be described in detail by way of example with reference to the accompanying drawings. In the following embodiments of the present invention, a glass substrate having a diameter of five inches was used, and as a plating conductive under-layer film, an NiFe permalloy film having a thickness of 0.15 μm and a magnetostriction constant $\lambda$ of $-3$ to $-4 \times 10^{-7}$ was formed by sputtering technique.

For electroplating, a bath temperature of 30° C. and a pH value of 3.6 were provided. In bath composition, an $Fe^{+2}$ metal ion concentration was 0.5 to 1.5 g/l, and an $Ni^{+2}$ metal ion concentration was 10 to 30 g/l. Sodium benzosulfimide, boric acid, and sodium chloride had concentrations of 1.0 to 2.0 g/l, 20 to 30 g/l, and 20 to 30 g/l, respectively.

As plating power supply, a constant-current source was used, and for setting time periods and current values of plating, a personal computer was employed. Thus, it was allowed to set up an arbitrary impressed current sequence in increments of one second and one mA.

For film composition measurement, a fluorescent X-ray analyzer was used, and for magnetostriction constant measurement, a thin film B-H tracer was used. With respect to variation in an anisotropic magnetic field Hk of a film at the time of stress application, calculation was performed using the following Equation (1):

$$Hk=Hk0\pm 3\ \lambda\sigma(1+v)/Is(A/m) \quad (1)$$

where "Hk0" is an anisotropic magnetic field of each film under no stress (A/m), "$\lambda$" is a magnetostriction constant, "v" is a Poisson ratio of each film (taken as 0.32), "$\sigma$" is a stress (Pa), and "Is" is a saturation flux density (taken as 1T).

The direction of an applied magnetic field was matched with that of a stress, and a three-point bending method was used for stress application. While varying the stress $\sigma$, the anisotropic magnetic field Hk was measured. Based on a rate of change in the anisotropic magnetic field Hk, the magnetostriction constant $\lambda$ was determined.

Figure 7:
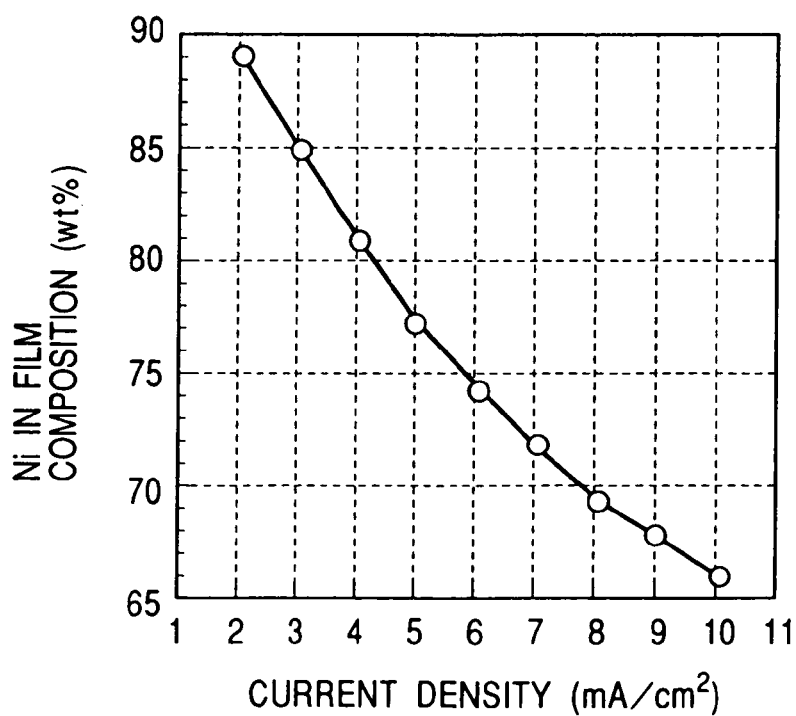
FIG. 7 is a diagram showing a relationship between plating current density and Ni in film composition.

A plating current value per unit area represents a plating current density (or referred to simply as a current density), and according to the current density, a plating film having such a film composition (Ni content) as shown in FIG. 7 is formed in a plating bath under the above-mentioned conditions.

Figure 6:
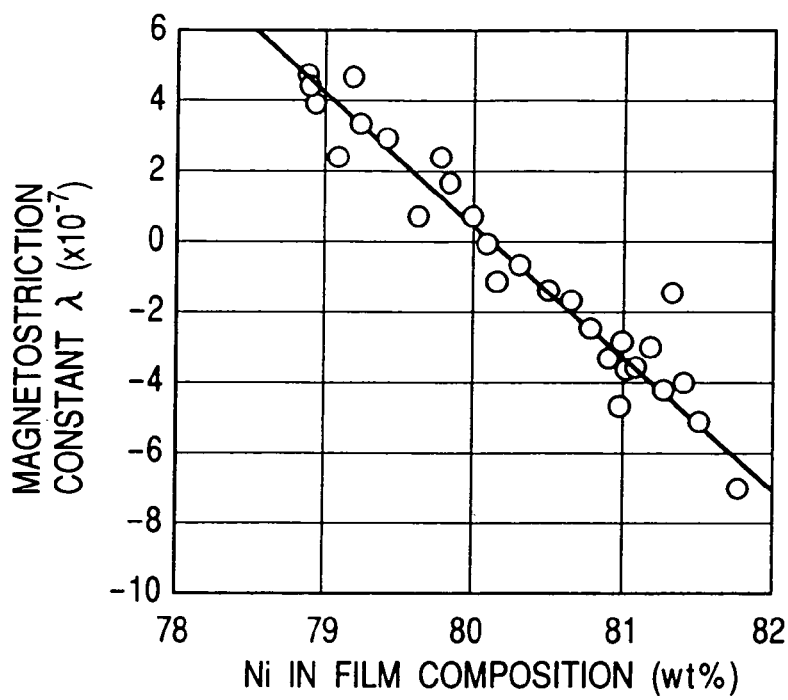
FIG. 6 is a diagram showing a relationship between Ni in film composition and magnetostriction constant $\lambda$.

Based on the film composition indicated in FIG. 7, the magnetostriction constant $\lambda$ representing a magnetic characteristic of the plating film can be attained as shown in FIG. 6. Note that since each film indicated in FIGS. 6 and 7 was formed to have a thickness of 3.5 $\mu$m by applying a constant current for initial and upper layers, the values in these figures include variations in the film composition and magnetostriction constant $\lambda$ of the initial layer.

Since the thickness of a plating film depends on the amount of electrolysis, it is proportional to a plating time with respect to a constant current. In a situation where a plating film having a magnetostriction constant $\lambda$ of $-3.5\times 10^{-7}$ and a thickness of 3.5 $\mu$m is formed as an upper shield film, an Ni content of 81.1 wt % and a current density i of 4 mA/cm$^2$ are provided as shown in FIGS. 6 and 7. Further, since the area to be plated is 112.5 cm$^2$ according to the configuration of the substrate, a current value I of 450 mA is provided.

Figure 8:
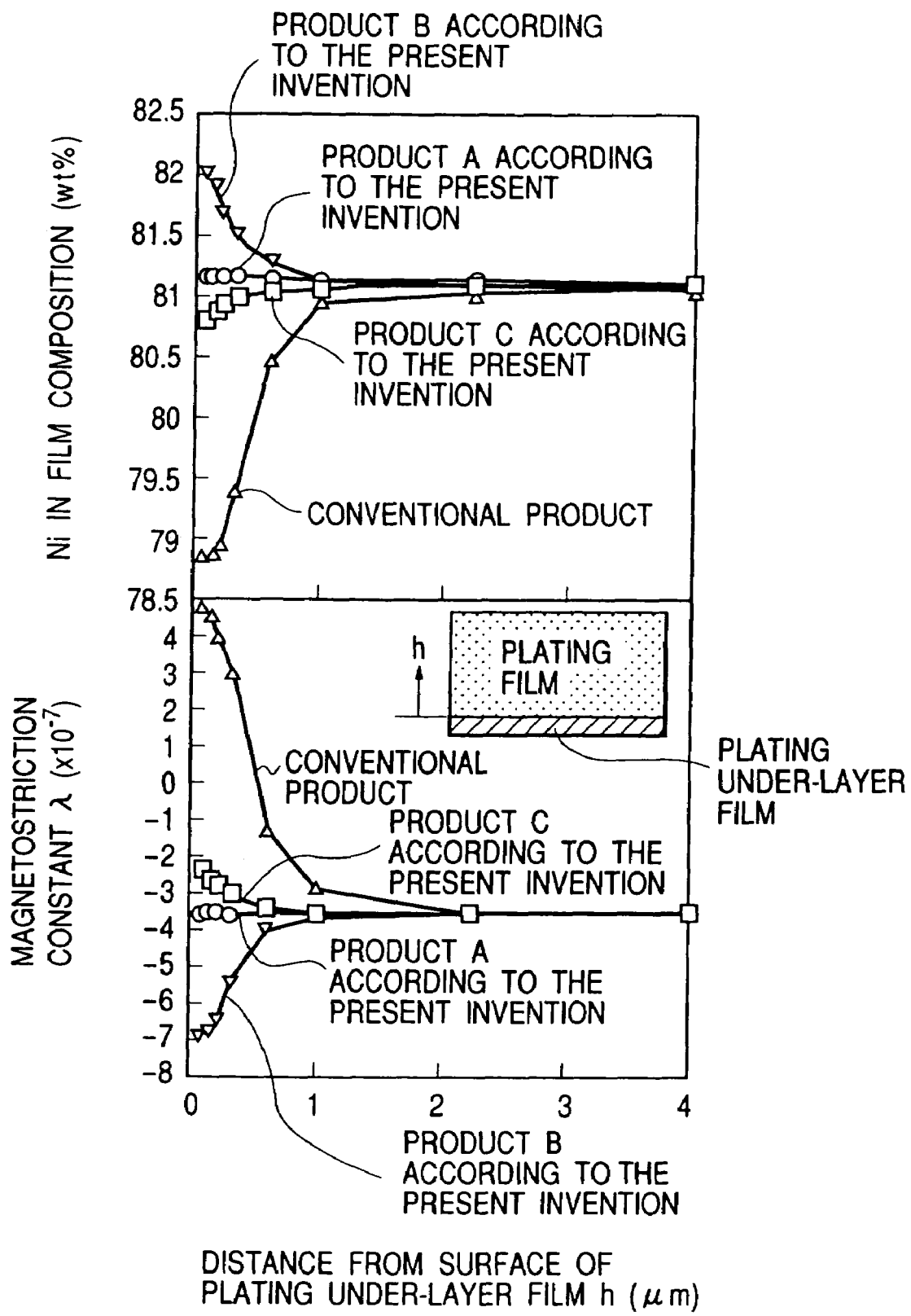
FIG. 8 shows diagrams indicating Ni in film composition and magnetostriction constant $\lambda$ with respect to film thickness in comparison between products according to the present invention and conventional products.

In a conventional technique, a constant current I of 450 mA is applied from the start of plating to the end thereof. Therefore, as shown in FIG. 8, the Ni content decreases significantly in the film thickness range below 1.0 $\mu$m. Where Ni is 81.1 wt % and $\lambda$ is $-3.5\times 10^{-7}$ in a film of 3.5 $\mu$m in thickness, Ni is 78.9 wt % and $\lambda$ is $+4.8\times 10^{-7}$ in an initial layer of 0.2 $\mu$m in thickness, resulting in a film composition difference $\Delta$ Ni of 2.2 wt % and a magnetostriction constant shift $\Delta\lambda$ of $8.3\times 10^{-7}$. Besides, magnetostriction becomes positive. FIG. 8 presents the results of measurements of film compositions and magnetostriction constants $\lambda$ using substrates plated in respective film thicknesses.

Figure 11:
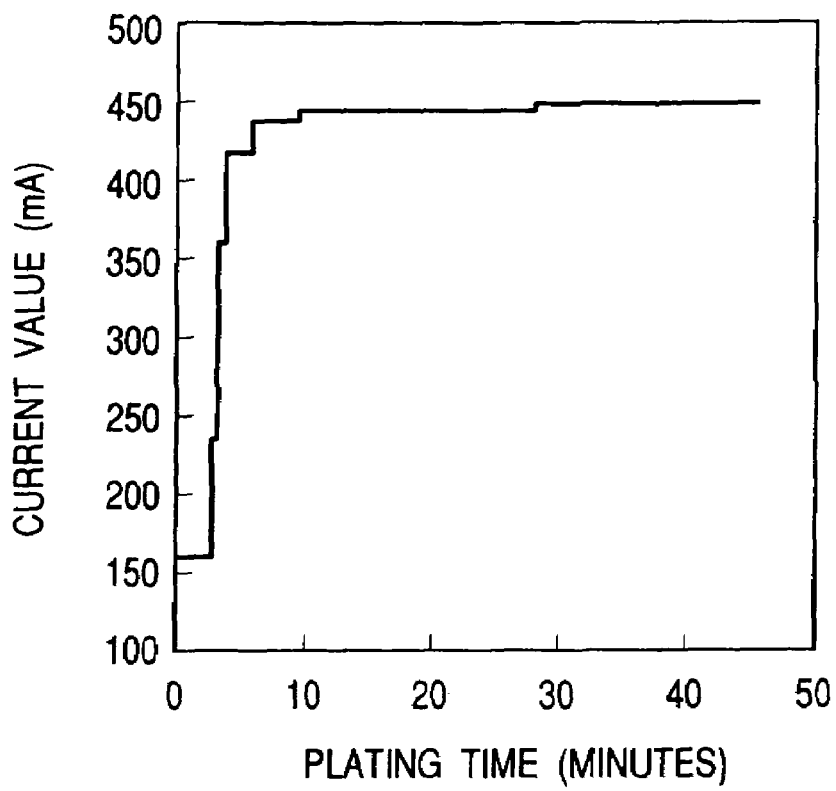
FIG. 11 is a diagram showing a plating current sequence according to the present invention.

In the exemplary embodiments of the present invention, a current value I and a current applying time t at the start of plating were set on the low current side as follows; $I_1=160$ mA (i=1.42 mA/cm$^2$) and $t_1=120$ sec. Then, the current value was increased stepwise to the high current side as follows; $I_2=240$ mA (i=2.13 mA/cm$^2$) and $t_2=30$ sec, $I_3=360$ mA (i=3.20 mA/cm$^2$) and $t_3=30$ sec, $I_4=420$ mA (i=3.73 mA/cm$^2$) and $t_4=150$ sec, $I_5=440$ mA (i=3.91 mA/cm$^2$) and $t_5=180$ sec, $I_6=445$ mA (i=3.96 mA/cm$^2$) and $t_6=1125$ sec, and $I_7=450$ mA (i=4.00 mA/cm$^2$) and $t_7=1125$ sec. FIG. 11 shows this current sequence for plating. Using such a stepwise current sequence, it was allowed to provide a film composition shown in FIG. 8. More specifically, in an example where Ni was 81.1 wt % and $\lambda$ was $-3.5\times 10^{-7}$ in a film of 3.5 $\mu$m in thickness, Ni was 80.9 wt % and $\lambda$ was $-3.3\times 10^{-7}$ in an initial layer of 0.2 $\mu$m in thickness, i.e., it was enabled to form a film having a film composition difference $\Delta$ Ni of 0.2 wt % and a magnetostriction constant shift $\Delta\lambda$ of $1.2\times 10^{-7}$. Unlike the aforementioned conventional technique in which a film is formed by applying the constant current I of 450 mA, the film composition and magnetostriction constant of the initial layer could be equivalent to those of the upper layer in the embodiment of the present invention.

Figure 9:
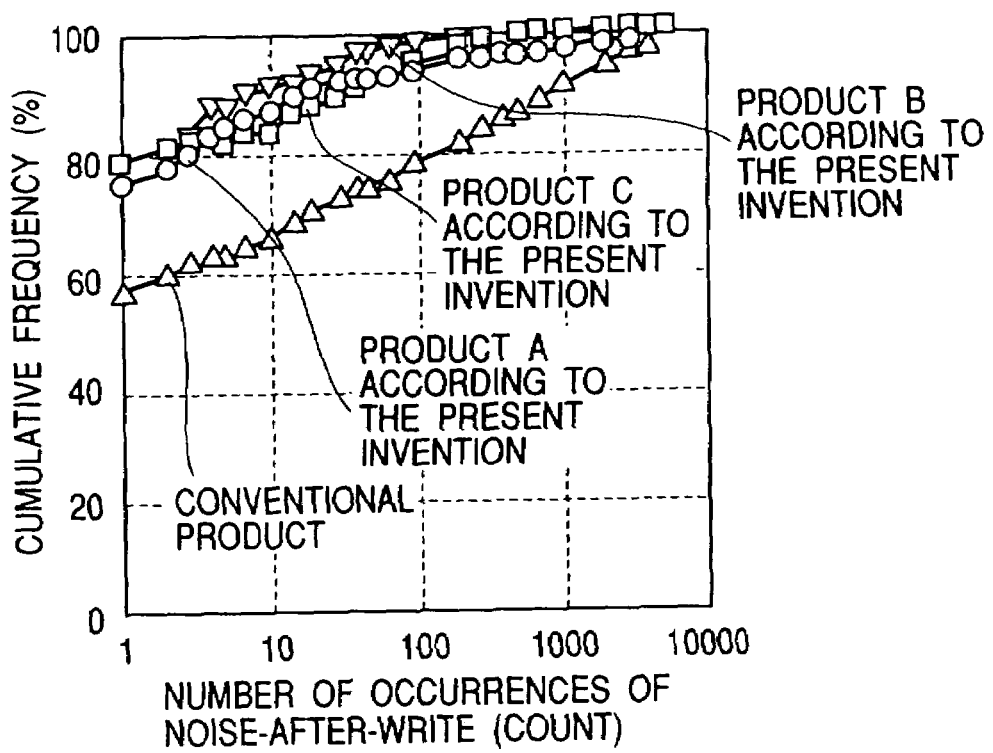
FIG. 9 is a diagram showing a cumulative frequency of occurrences of noise-after-write in comparison between products according to the present invention and conventional products.
Figure 10:
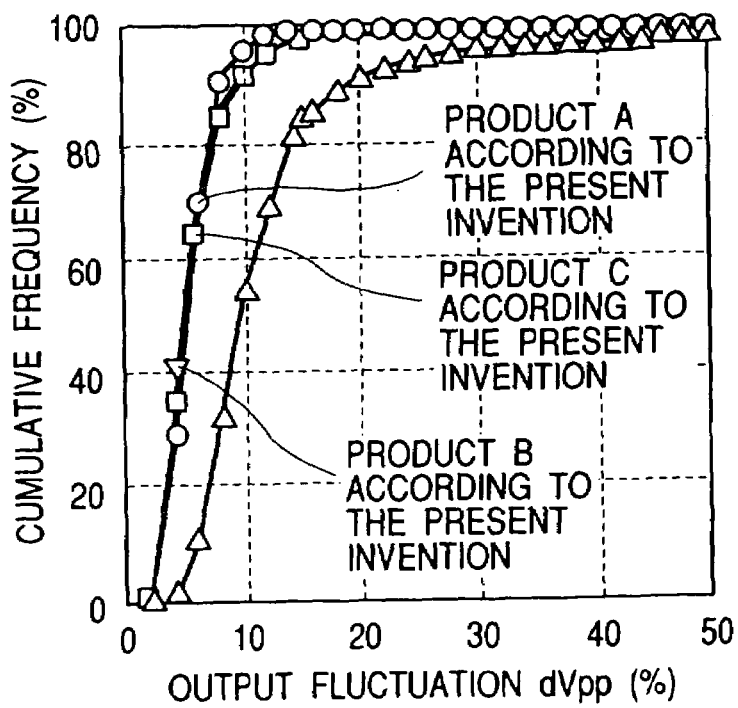
FIG. 10 is a diagram showing a cumulative frequency of output fluctuation in comparison between products according to the present invention and conventional products.

Moreover, by setting the plating current values $I_1$ to $I_4$ further stepwise on the low current side, it was allowed to provide an initial layer having an Ni-rich film composition as shown in FIG. 8. In an example where Ni was 81.1 wt % and $\lambda$ was $-3.5\times 10^{-7}$ in a film of 3.5 $\mu$m in thickness, Ni was 82.0 wt % and $\lambda$ was $-7.0\times 10^{-7}$ in an initial layer of 0.2 $\mu$m in thickness, i.e., it was enabled to form a film having a film composition difference $\Delta$ Ni of $-0.9$ wt % and a magnetostriction constant shift $\Delta\lambda$ of $-3.5\times 10^{-7}$. Using the above-demonstrated method, the inventors formed a film A comprising an initial layer and an upper layer in which a film composition difference and a magnetostriction constant shift were reduced to provide equivalent film composition, an Ni-rich film B, and an Fe-rich film C as an upper shield in fabrication of a magnetic thin film head. Then, each of these films A, B and C was subjected to evaluation in terms of noise-after-write and output fluctuation. FIGS. 9 and 10 show the results of this evaluation. In the evaluation, for each of 350 magnetic thin film head sliders, a write-read operation was repeated 10,000 times at a write frequency of 60 to 180 MHz, and the number of occurrences of noise-after-write and the percentage of output fluctuation dvpp were measured to attain cumulative frequencies. In comparison with the conventional technique, under target requirements that the number of occurrences of noise-after-write (=WN) should be 10 or less per slider and the output fluctuation dVpp should be 10% or less, the WN was reduced by approximately 20% and the dvpp was reduced by approximately 40% in the film A, the WN was reduced by approximately 21% and the dvpp was reduced by approximately 39% in the film B, and the WN was reduced by approximately 18% and the dvpp was reduced by approximately 38% in the film C. The films A, B and C, having an equivalent level of magnetic head electrical characteristic, could provide advantageous effects that noise-after-write was reduced by approximately 20% and output fluctuation was reduced by approximately 40% in comparison with conventional products.

TABLE 1 shows the judgment results of magnetic thin film head evaluation on the conventional products and the films A, B and C according to the present invention.

TABLE 1

| No | Species | Shield thickness | Total Film λ ×10−7 | Total Film Ni wt % | Initial Layer λ ×10−7 | Initial Layer Ni wt % | Judgment Result NAW*** | Judgment Result OF**** |
|---|---|---|---|---|---|---|---|---|
| Conv.*1 | 2.7 μmthick | 2.7 μm | −4 | 81.2 | 4.3 | 78.8 | X | X |
| Conc. 2 | 3.5 μmthick | 3.5 μm | −3.5 | 81.1 | 4.8 | 78.9 | Δ | Δ |
| Inv.**A | SameComp. | 3.0 μm | −3.5 | 81.1 | −3.5 | 81.8 | ○ | ○ |
| Inv. B | Ni-rich | 3.0 μm | −3.5 | 81.1 | −7 | 82 | ○ | ○ |
| Inv. C | Fe-rich | 3.0 μm | −3.5 | 81.1 | −2 | 80.8 | ○ | ○ |

Figure 1:
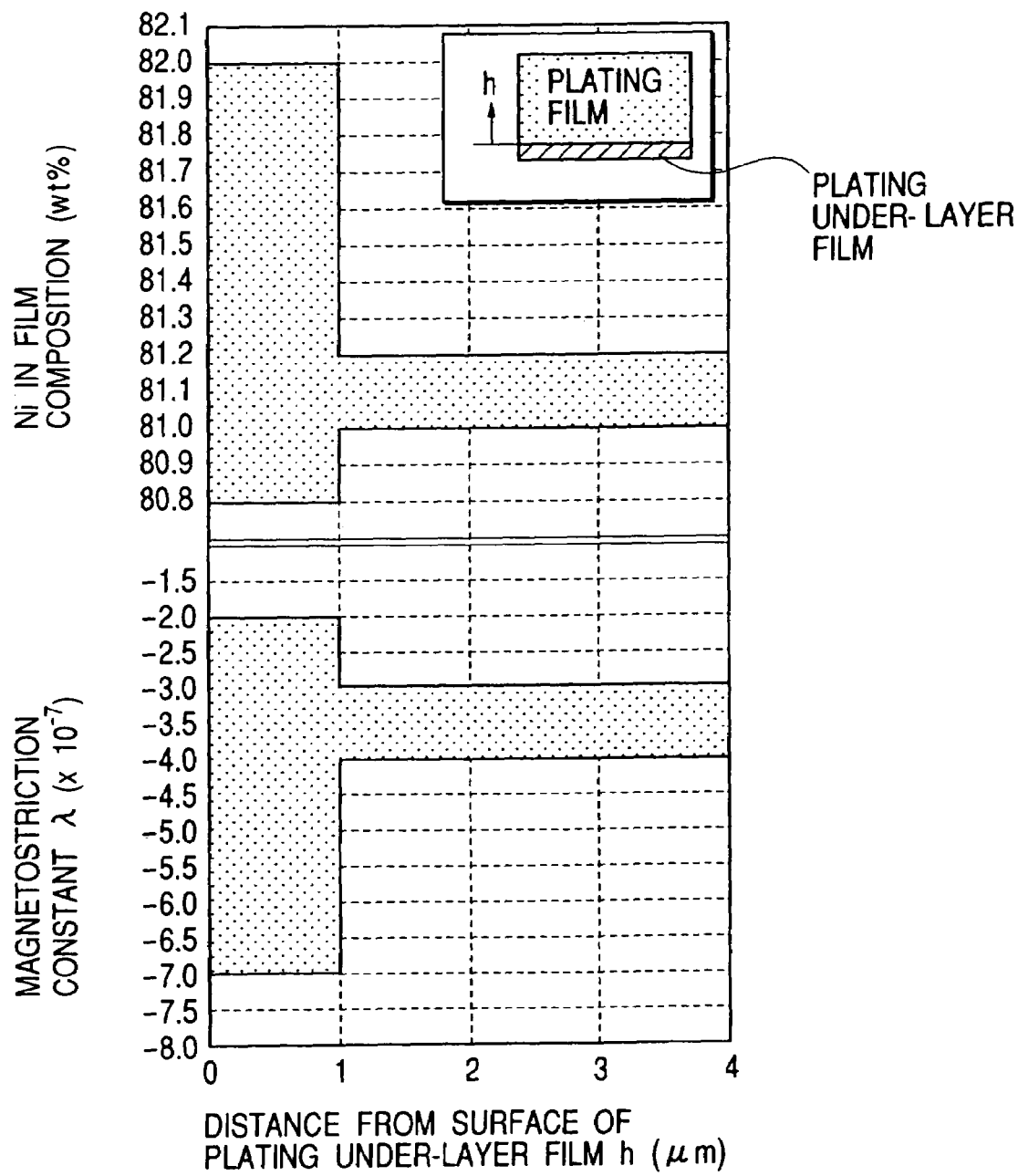
FIG. 1 is a diagram showing a region of Ni in film composition and a region of magnetostriction constant $\lambda$ with respect to film thickness according to the present invention.
Figure 2:
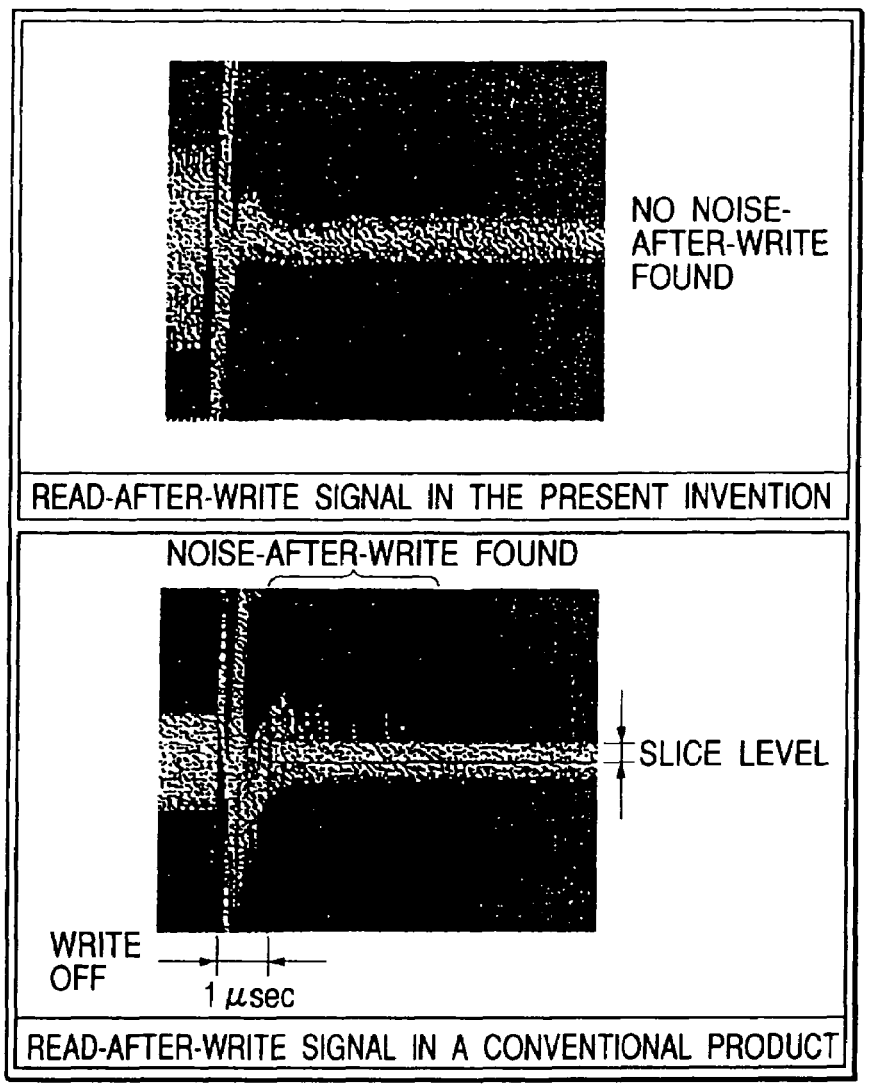
FIG. 2 shows diagrams indicating noise-after-write.
Figure 3:
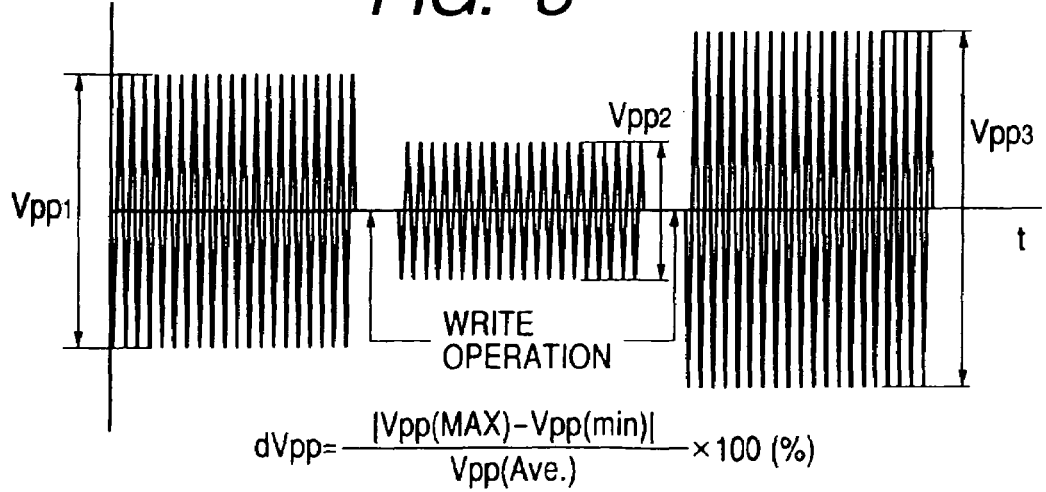
FIG. 3 is a diagram showing output fluctuation.

*Conventional Product
**Present Invention Product
***Noise-After-Write
*****Output Fluctuation Further, the inventors conducted prototype examinations using the method of varying current values stepwise. Thus, it was allowed to form a film having a film composition and magnetostriction constant such as shown in FIGS. 1 and 2 with respect to the direction of film thickness. Using the film thus formed as an upper shield, a magnetic thin film head was fabricated so as to significantly reduce noise-after-write and output fluctuation.

Figure 4:
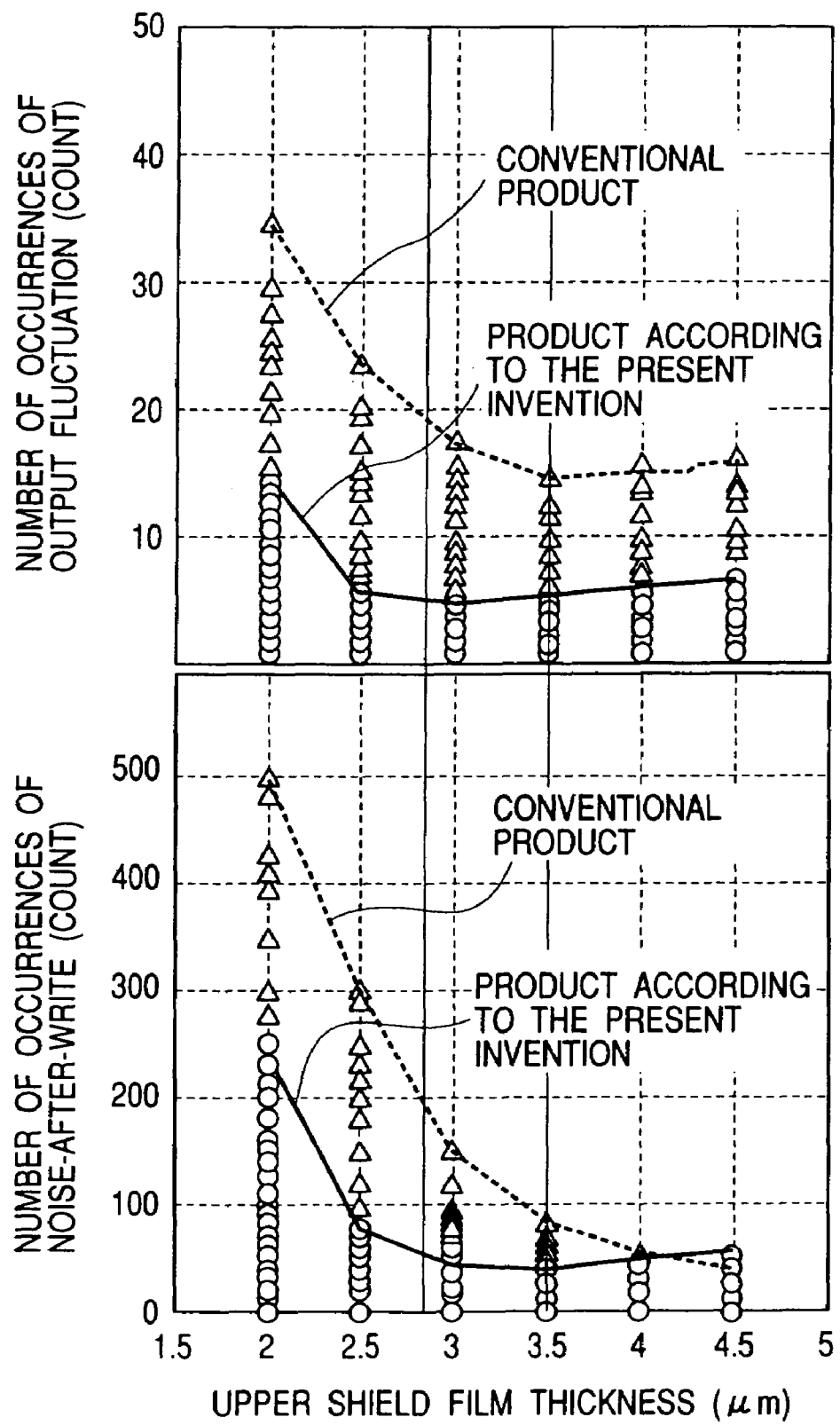
FIG. 4 shows diagrams indicating noise-after-write and output fluctuation with respect to film thickness.
Figure 5:
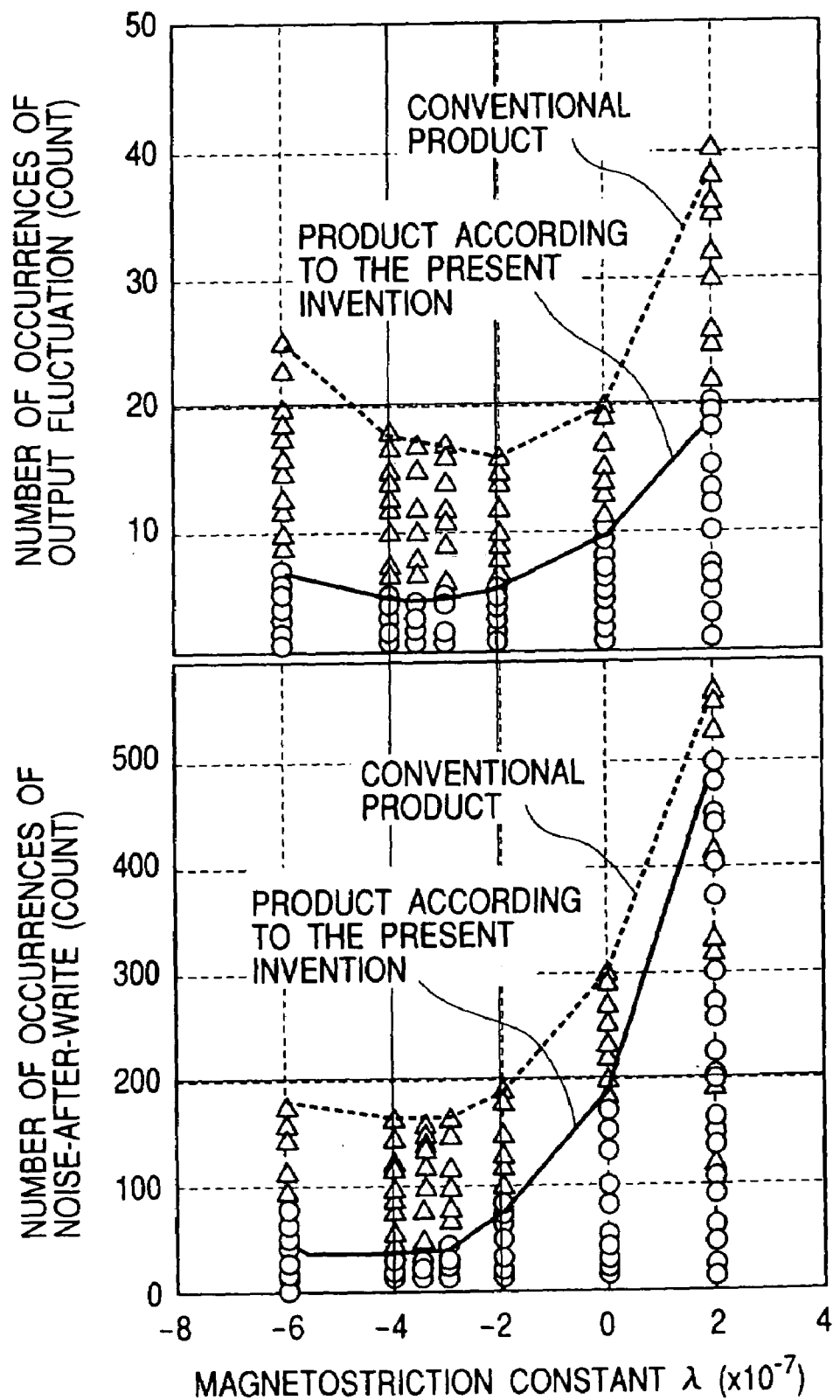
FIG. 5 shows diagrams indicating noise-after-write and output fluctuation with respect to magnetostriction constant $\lambda$.

Still further, using the current sequence for the film A shown in FIG. 11, the inventors examined dependencies of noise-after-write and output fluctuation on film composition and magnetostriction constant characteristics. FIGS. 4 and 5 show the results of the examinations made by the inventors. As contrasted with the conventional products, in a shield film thickness of 2.5 μm or more, noise-after-write and output fluctuation were minimized and a degree of film thickness dependency was reduced. In terms of magnetostriction constant, in the range of $-3.5 \times 10^{-7}$ or less, noise-after-write and output fluctuation were minimized and a degree of magnetostriction constant dependency was reduced.

As another preferred embodiment for reducing variation in film composition with respect to the direction of film thickness, there is provided a plating method in which film plating is performed while varying a stirring speed, bath temperature, bath composition, pH or any other parameter with time. As a stirring condition, a stirrer bar was reciprocated in a plating solution in the vicinity of each substrate surface to be plated. More specifically, while an stirring speed of 70 reciprocations/minute was taken for an upper layer, a higher stirring speed of 100 reciprocations/minute was taken for an initial layer, resulting in suppression of Fe richness in the initial layer. As a bath temperature condition, a bath temperature of 38° C. was set at the start of plating, and then the bath temperature was regulatingly decreased to 30° C. in formation of initial and upper layers using a heat cooling mechanism, resulting in the same advantageous effect as mentioned above. As a pH condition, film plating was started at a pH value of 2.5, and then in formation of an upper layer, the pH value was increased to 3.0 by alkalimetry, resulting in the same advantageous effect as mentioned above. As a bath composition condition, from the start of plating, a concentrated iron sulphate solution was titrated to vary a metal ion concentration ratio ($Ni^{2+}/Fe^{2+}$) resulting in the same advantageous effect as mentioned above.

Besides, an NiFe alloy having an Ni content of 44 to 48 wt %, which provides a high saturation flux density, may be used as an upper shield material. In electroplating with this material, a film composition difference Δ Ni between the initial and upper layers can be reduced by properly varying current values stepwise.

Figure 12:
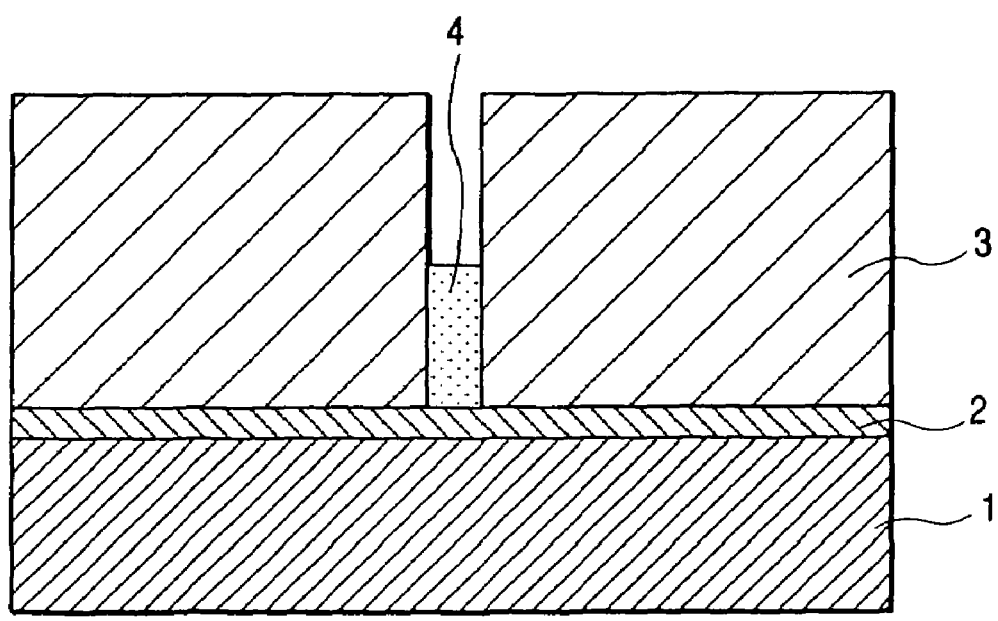
FIG. 12 is a diagram illustrating an upper write pole formed by electroplating.
Figure 13:
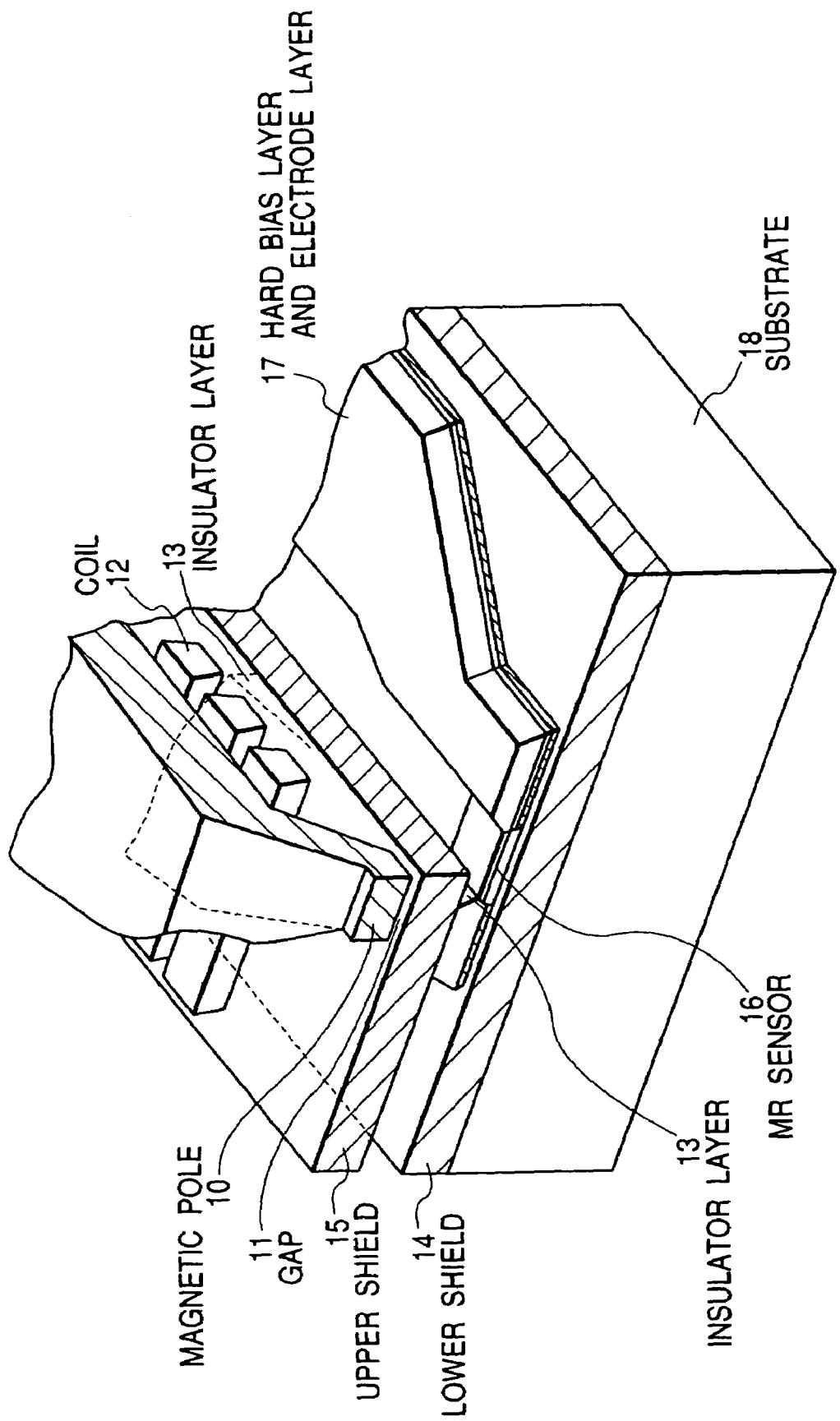
FIG. 13 is a sectional view showing the tip end of a magnetic thin film head.

With reference to FIGS. 12 and 13, another embodiment of the present invention will then be described below. FIG. 12 is a sectional view showing an upper write pole 4 formed by electroplating, which corresponds to the end part of a magnetic core 10 indicated in FIG. 13. The upper write pole 4 is made of permalloy or NiFe alloy material having an Ni content of 44 to 48 wt %, which provides a high saturation flux density. In this example, a film composition difference Δ Ni of 3.0 wt % between the initial and upper layers was reduced to 0.5 wt %. For composition measurement, a cross section of the upper write pole 4 was examined by EDX (Energy Dispersive X-ray analysis)method. The upper write pole 4 can be formed in the following manner: First, on a substrate 1, a plating conductive under-layer film 2 is formed by sputtering technique, and then a resist frame 3 is formed into the shape of the magnetic core 10 including the upper write pole 4. Thereafter, film plating is performed so that the upper write pole 4 is formed in a space having an inter-frame distance of 0.5 to 1.0 μm and a frame height of 5 to 10 μm. Thus, the upper write pole 4 is formed as an extremely narrow part having an aspect ratio of 10 to 20. Since there is a significant difference in area between the upper write pole 4 and the adjacent plating pattern part, a difference in current density tends to occur. Further, depending on bath stirring conditions, a difference in bath composition tends to occur. These are the causes of composition variation in the direction of film thickness.

Figure 14A:
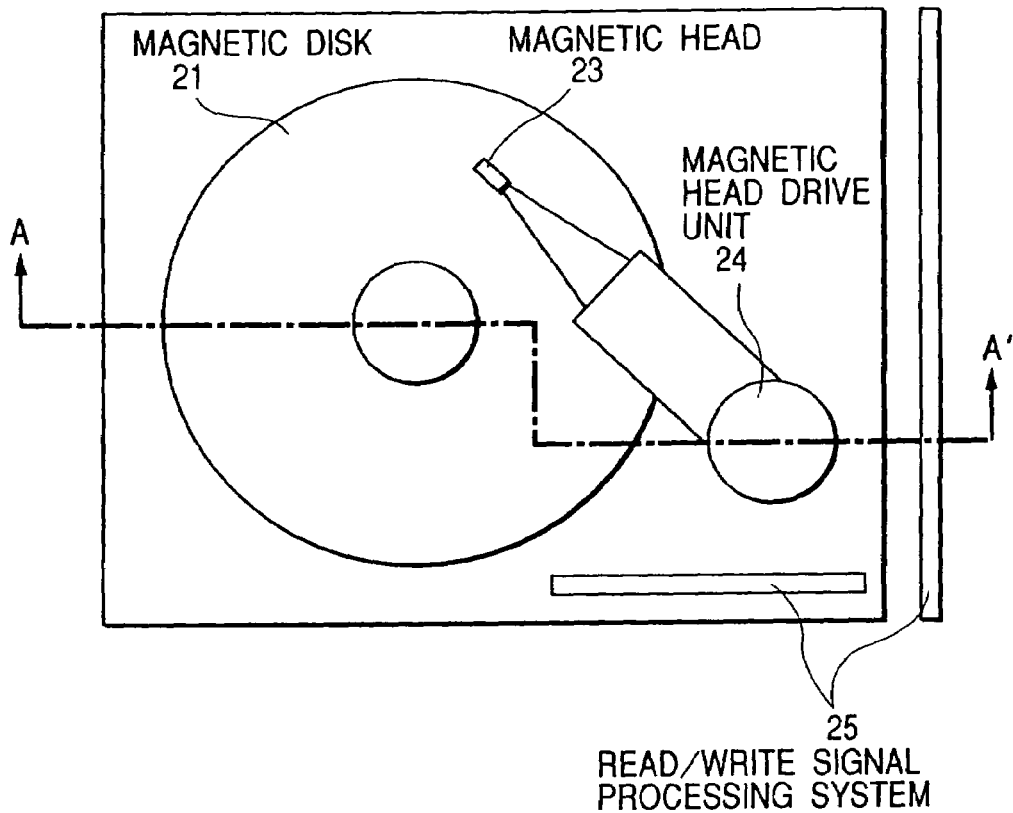
FIG. 14 is a schematic diagram showing a magnetic disk apparatus comprising a magnetic thin film head according to the present invention.
Figure 14B:
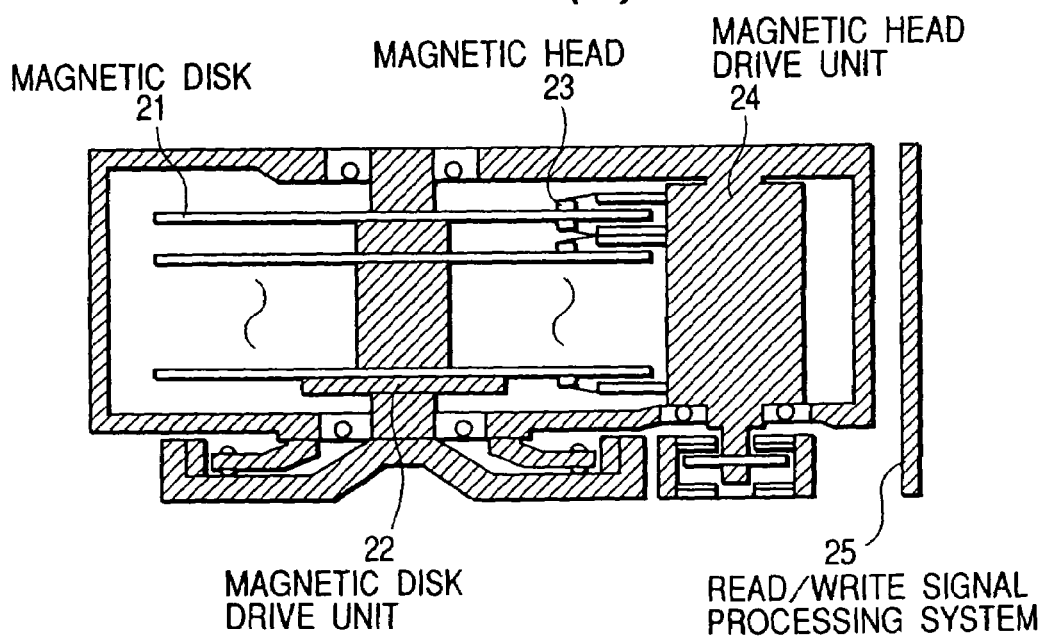

Using the magnetic thin film head of the present invention, the inventors manufactured a magnetic disk apparatus. FIG. 14 shows a structural scheme of the magnetic disk apparatus thus manufactured.

While the present invention has been described in detail with respect to the preferred embodiments concerning fabrication of a magnetic thin film head, it is to be understood that the plating film fabrication method described herein is also applicable to fabrication of electronic circuit substrates.

As set forth hereinabove and according to the present invention, in fabrication of a magnetic thin film head comprising a write head element and a read head element for use in a magnetic recording apparatus, an upper shield film is formed in such a fashion that the composition of an initial layer in plating is precisely controlled by varying plating current density stepwise. Thus, it is possible to fabricate a magnetic thin film head featuring significantly reduced noise-after-write and output fluctuation. Further, using the magnetic thin film head thus fabricated, it is also possible to provide a magnetic disk apparatus featuring higher recording density and higher-rate communication.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of fabricating a magnetic thin film comprising the steps of:
    a) forming a write head element;
    b) forming a read head element;
    wherein a ferromagnetic film formed between said write head element and said read head element, having a soft magnetic characteristic and a magnetic shield function is provided in the vicinity of a sensor film arranged as said read head element,
    wherein said ferromagnetic film comprises NiFe material and is formed by an electroplating method,
    wherein the Ni composition of an initially formed layer of said ferromagnetic film has a thickness of 1.0 μm is 80.8 to 82.0 wt %, and
    wherein the Ni in composition of an upper layer above said initially formed layer of said ferromagnetic film is 81.0 to 81.2 wt %,
    c) timewise regulating a current density of the electroplating under control of a personal computer;
    wherein a Ni content accuracy is controlled to differ in a thickness direction of said ferromagnetic film to decrease a noise-after-write and an output fluctuation,
    d) wherein a plurality of time periods and a plurality of current values are preset for film formation.

2. A method of fabricating a magnetic thin film comprising the steps of:
    a) forming a write head element; and
    b) forming a read head element;
    wherein a ferromagnetic film formed between said write head element and said read head element, having a soft magnetic characteristic and a magnetic shield function is provided in the vicinity of a sensor film arranged as said read head element,
    wherein said ferromagnetic film comprises NiFe material and is formed by an electroplating method,
    wherein in a first region of said ferromagnetic film which exceeds 1.0 μm in thickness from an initial formed layer, Ni content accuracy is ±0.1 wt %, and
    wherein in a second region of said ferromagnetic film which is 1.0 μm or less in thickness from said initial formed layer, Ni content accuracy is ±0.3 wt %, wherein a Ni content accuracy is controlled to differ in a thickness direction of said ferromagnetic film to decrease a noise-after-write and an output fluctuation.

3. The method of fabricating a magnetic thin film according to claim 1, wherein said initially formed layer has a lower Ni content accuracy than said upper layer.

4. The method of fabricating a magnetic thin film according to claim 3, wherein said Ni content accuracy of said initially formed layer is ±0.3 wt %, and wherein said Ni content accuracy of said upper layer is ±0.1 wt %.

5. The method of fabricating a magnetic thin film according to claim 3,
    further including changing a current density used for electroplating when said ferromagnetic film is formed.

6. A method of manufacturing a magnetic head, including a substrate, a lower shield, a sensor, a upper shield, comprising steps of:
    forming said upper shield including steps of:
    forming a first region comprising NiFe by electroplating, and
    forming a second region comprising NiFe above said first region by electroplating,
    wherein in forming said first and second regions, Ni content accuracy is controlled so that said second region has a higher Ni content accuracy than said first region to decrease a noise-after-write and an output fluctuation.

7. The method of manufacturing a magnetic head according to claim 6,
    wherein during said forming of said first region a first current is used for electroplating, and during said forming of said second region a second current is used for electroplating,
    wherein said second current is larger than said first current.

8. The method of manufacturing a magnetic head according to claim 6, wherein said first region has a thickness of 1.0 μm or less,
    wherein said Ni content accuracy of said first region is ±0.3 wt %, and
    wherein said Ni content accuracy of said second region is ±0.1 wt %.

9. The method of manufacturing a magnetic head according to claim 6,
    wherein Ni composition of said first region is 80.8 wt % to 82.0 wt %, and
    wherein Ni composition of said second region is 81.0 wt % to 81.2 wt %.

10. The method of manufacturing a magnetic head according to claim 6, wherein said first region has a thickness of 1.0 μm or less,
    wherein said Ni content accuracy of said first region is ±0.3 wt %,
    wherein said Ni content accuracy of said second region is ±0.1 wt %;
    wherein Ni composition of said first region is 80.8 wt % to 82.0 wt %, and
    wherein Ni composition of said second region is 81.0 wt % to 81.2 wt %.

* * * * *